United States Patent [19]

Averbuch

[11] Patent Number: 5,268,933
[45] Date of Patent: Dec. 7, 1993

[54] DATA PACKET ALIGNMENT IN A COMMUNICATION SYSTEM

[75] Inventor: Nimrod Averbuch, Grove, Ill.

[73] Assignee: Motorola, Inc., Schaumburg, Ill.

[21] Appl. No.: 766,689

[22] Filed: Sep. 27, 1991

[51] Int. Cl.$^5$ .............................................. H04B 7/06
[52] U.S. Cl. ................................... 375/107; 375/100; 370/94.1; 455/51.1; 455/54.1; 455/56.1; 455/101; 455/103
[58] Field of Search ............... 375/100, 107; 370/94.1, 370/94.2, 95.1, 95.3, 104.1; 455/13.2, 49.1, 51.1, 54.1, 56.1, 88, 101, 103; 340/825.44

[56] References Cited

U.S. PATENT DOCUMENTS

| | | | |
|---|---|---|---|
| 4,218,654 | 8/1980 | Ogawa et al. | 370/104.1 |
| 4,654,867 | 3/1987 | Labedz et al. | 455/51.1 |
| 4,696,051 | 9/1987 | Breeden | 455/56.1 |
| 5,014,344 | 5/1991 | Goldberg | 375/107 |
| 5,103,459 | 4/1992 | Gilhousen et al. | 379/59 |

Primary Examiner—Curtis Kuntz
Assistant Examiner—Young Tse
Attorney, Agent, or Firm—Richard A. Sonnentag

[57] ABSTRACT

A communication system provides data packet timing alignment to facilitate soft handoff. A vocoder (315) transmits compressed voice frames to base-stations (130,131) along links (110,112) of variable length, $\Delta_L$. The $\Delta_L$ translates to a delay $\Delta_t$ in the air-frames to be transmitted by the base-stations (130,131). To compensate for the time delay $\Delta_t$, the communication system advances both sets of air-frames to be transmitted by base-stations (130,131) by at least $\Delta_t$ so that skipping of frames, relative to an air-frame reference (300), during transmission does not occur.

19 Claims, 3 Drawing Sheets

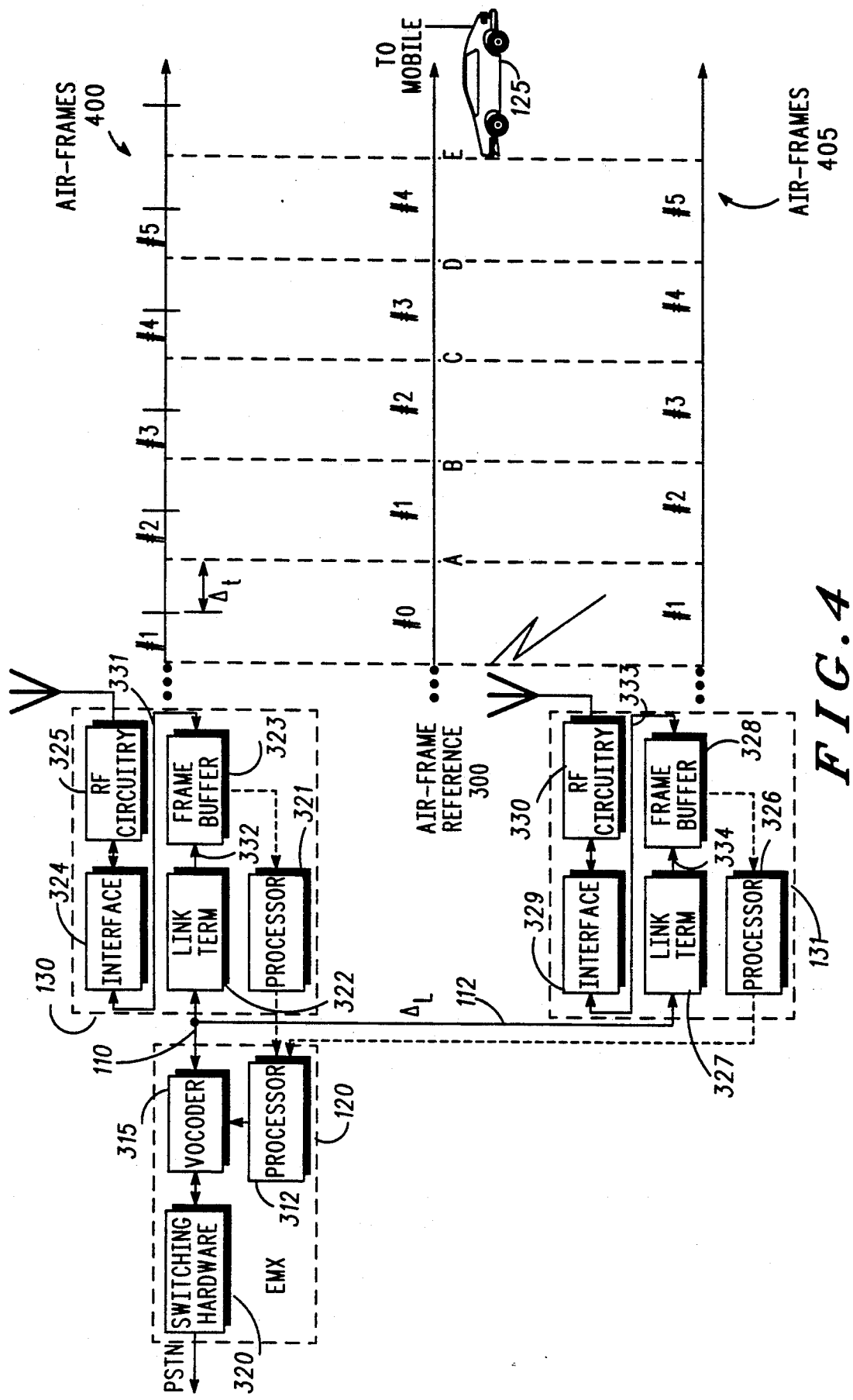

DATA PACKET ALIGNMENT IN A COMMUNICATION SYSTEM

FIELD OF THE INVENTION

This invention relates generally to communications systems and more particularly to communication systems requiring data packet timing alignment.

BACKGROUND OF THE INVENTION

Communication systems designed to incorporate the characteristic of communicating with many remote subscriber units for brief intervals on the same communication channel are termed multiple access communication systems. One type of communication system which can be a multiple access system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Generally, three types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

Spread spectrum communication systems can be implemented as multiple access systems in a number of different ways. One type of multiple access spread spectrum system is a code division multiple access (CDMA) system. CDMA spread spectrum systems may use direct sequence (DS-CDMA) or frequency hopping (FH-CDMA) spectrum spreading techniques. FH-CDMA systems can further be divided into slow frequency hopping (SFH-CDMA) and fast frequency hopping (FFH-CDMA) systems. In SFH-CDMA systems, several data symbols representing a sequence of data bits to be transmitted modulate the carrier wave within a single hop; in FFH-CDMA systems, the carrier wave hops several times per data symbol.

In a SFH-CDMA system, multiple communication channels are accomodated by the assignment of portions of a broad frequency band to each particular channel. For example, communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determined which one of the M frequencies is to be transmitted.

Multiple communication channels are allocated by using a plurality of spreading codes to assign portions of the frequency band to different channels during the same time period. As a result, transmitted signals are in the same broad frequency band of the communication channel, but within unique portions of the broad frequency band assigned by the unique spreading codes. These unique spreading codes preferably are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

As CDMA technology becomes incorporated into next generation cellular systems, practical system complications due to the nature of cellular systems arise. For example, in cellular systems incorporating soft handoff, transmitted frame synchronization is critical to proper operation. During soft handoff, a mobile having diversity reception capability receives voice or control transmissions from two base. Depending on the strength, or quality, of the transmission by either base-station, the mobile will choose the transmission of the base-station having the best signal quality. This configuration of the cellular system requires that the two base-stations transmit the same voice or control data at the same time so that the mobile could perform diversity on both signals from both base-stations.

The data packet synchronization process should also keep the packet delay as minimum as possible with respect to the air framing boundaries in order to reduce the overall packet delay in the system. The synchronization process is inherently made more difficult since base-stations are typically at different distances from a central data distribution point (perhaps a switch). For accurate synchronization of transmission, the difference in distance of the links or trunks connecting the central data distribution points to the base-stations needs to be accounted for. Typical methods compute the delay from the central data distribution point to each base-station and accordingly delay the data packet to be transmitted. This process, however, has several major drawbacks. First, the computation of delay is a intensive calculation or measurement which consumes valuable processor time during handoff. More importantly, the delay difference between the cells and the central data distribution point is in the magnitude of several hundreds of $\mu$seconds. Considering a real-time processing environment for processing the packet delay computation (stamping dummy outbound packets and monitoring base-station arrival time messages), the computation response uncertainty is approximately the same magnitude as the measurement objectives. This results in a need to add one full packet delay (20 msec) in a case of mis-match caused by uncertainty in the computation response.

Thus, a need exists for a data packet alignment scheme which provides a finer degree of packet alignment resolution and is also not computation intensive.

SUMMARY OF THE INVENTION

A communication system, having at least a plurality of transmitters, transmits a first packet of data on a first transmitter and transmits a second packet of data on a second transmitter and aligns the first and second packets of data to facilitate synchronized transmission.

BRIEF DESCRIPTION OF THE DRAWINGS

FIG. 4 generally depicts air-frame alignment of the delay illustrated in FIG. 3 in accordance with the invention.

DETAILED DESCRIPTION OF A PREFERRED EMBODIMENT

Figure 1:
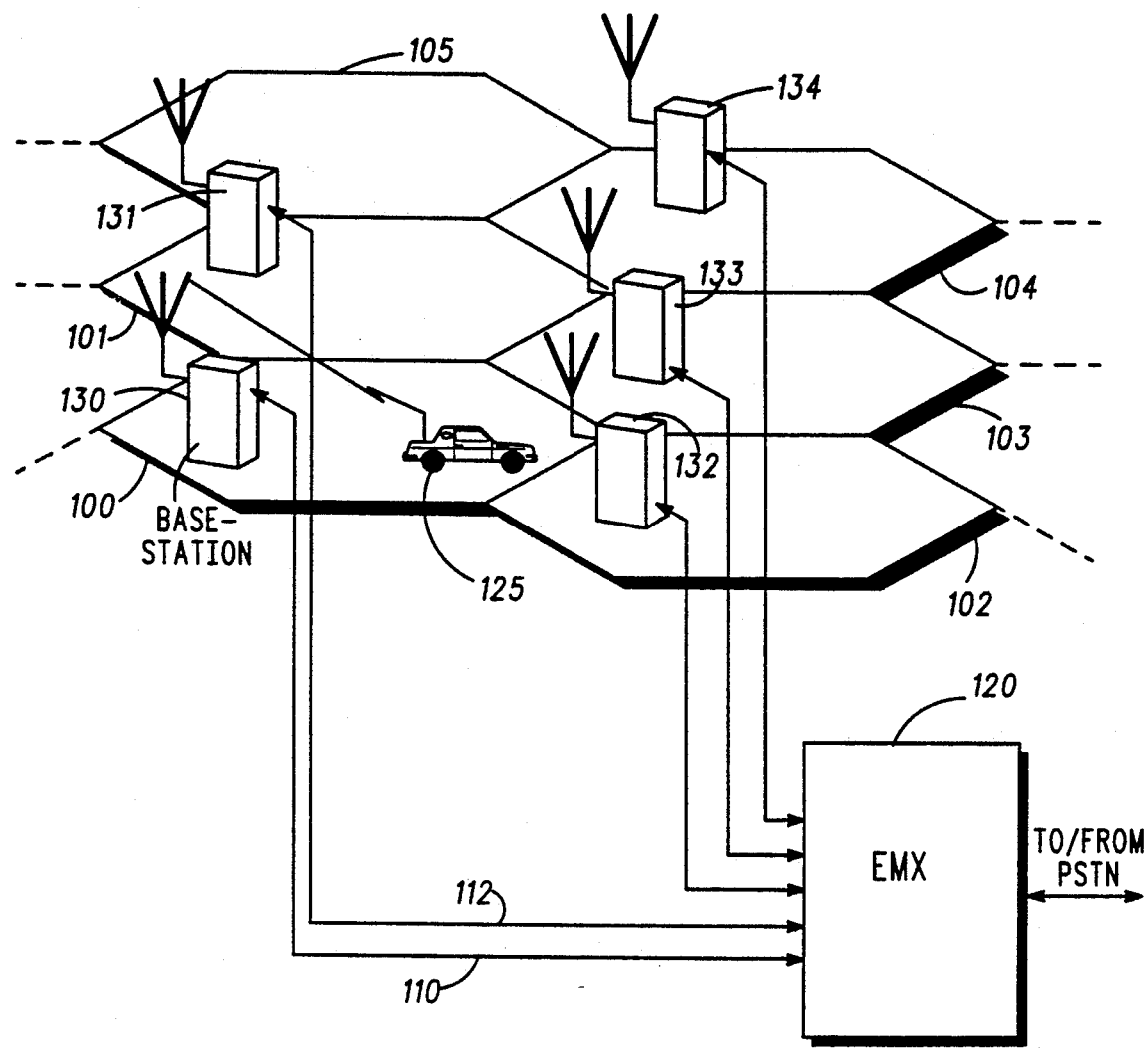
FIG. 1 generally depicts a communication system which may beneficially employ transmission synchronization in accordance with the invention.

FIG. 1 generally depicts a communications system in accordance with the invention. The communications system is a cellular radiotelephone system having base-stations 130–134 coupled to an EMX switch 120. The EMX 120 acts as an interface between the local public switched telephone network (PSTN) and the base-stations 130–134 of the cellular radiotelephone system. The EMX 120 may be of the type available from Motorola, Inc. and described in Motorola Instruction Manual No. 68P81054E59, published by Motorola Service Publications, Schaumburg, Ill. As a subscriber, or a mobile 125, moves throughout the radiotelephone system, handoff of communication between the mobile and its serving base-station, which as illustrated in FIG. 1 is base-station 130, is required. In the preferred embodiment, the mobile 125 has diversity capability which allows it to receive transmission from two separate base-stations at a time. The mobile 125, after receiving both transmissions, determines which of the two transmissions provides the best signal quality. The ability to choose the transmission which provides the best signal quality in real-time provides the mobile with the capability to perform a soft handoff. This soft handoff process can be successful only if both base-stations transmit the required data packets at exactly the same time. In the preferred embodiment, the data packets to be aligned contain voice data, but the alignment technique works equally well for other types of data, for example control data. In addition, the mobile may use a procedure called mobile-assisted handoff (MAHO) which allows for the elimination of scan receivers at the target base-stations 131–134. As the mobile moves away from the serving base-station 130, the quality of communication will degrade between it and the serving base-station 130. When the communication degrades below an acceptable level, the mobile 125 is sent a list of all the target base-stations 131–134 and told by the serving base-station 130 to determine if one of the target base-stations 131–134 is potentially a handoff candidate. The mobile measures the signal quality information signal, or a signalling channel, transmitted by each of the target base-stations 131–134 to produce a signal quality value for each measured signalling channel. The signalling channel transmitted by each target base-station 131–134 is at a distinct frequency. The mobile, at this point, can either send the measured signal quality values back to the serving base-station 130 for further processing or can make a handoff decision itself based on the values. The signal quality values measured by the mobile 125 are received signal strength indications (RSSI's) of the signalling channel of each of the target base-stations 131–134. The RSSI measured for each signalling channel represents the signal strength for that particular signalling channel at its particular frequency. The RSSI's, as is the diversity capability of the mobile 125, are used to facilitate handoff in the cellular radiotelephone system.

Figure 2:
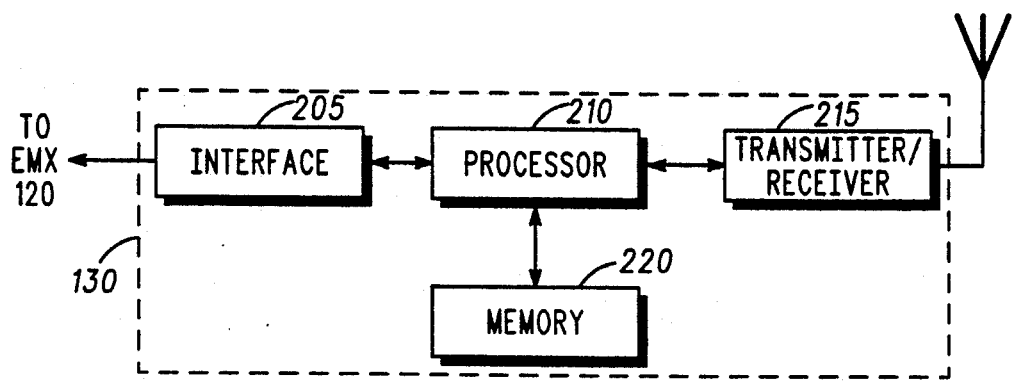
FIG. 2 generally depicts a block diagram of a base-station incorporated in the communication system of FIG. 1.

FIG. 2 generally depicts a block diagram of a base-station 130–134 used to implement the present invention. For purposes of example, on base-station 130 is depicted in FIG. 2. An interface 205, connects the base-station 130–134 to the EMX 120. The interface 205 is coupled to a processor 210, which in the preferred embodiment is a Motorola 56001 digital signal processor (DSP). The processor 210 is also coupled to a memory block 220, which includes RAM and ROM. The processor 210 is coupled to a transmitter/receiver 215 which interfaces between the processor 210 and the channel being transmitted by the base-station 130-134. Packets of compressed voice data entering the base-station 130-134 from the EMX 120 are input into the interface 205 and sent to the processor 210. The processor 210 processes the packets of compressed voice data by performing, inter alia, forward error correction (FEC), interleaving, and cyclic redundancy check (CRC) required for air framing. The processed air-frame then waits in memory 220 to be transferred to the transmitter/receiver 215 for transmission over the air at the appropriate time to the mobile 125.

Figure 3:
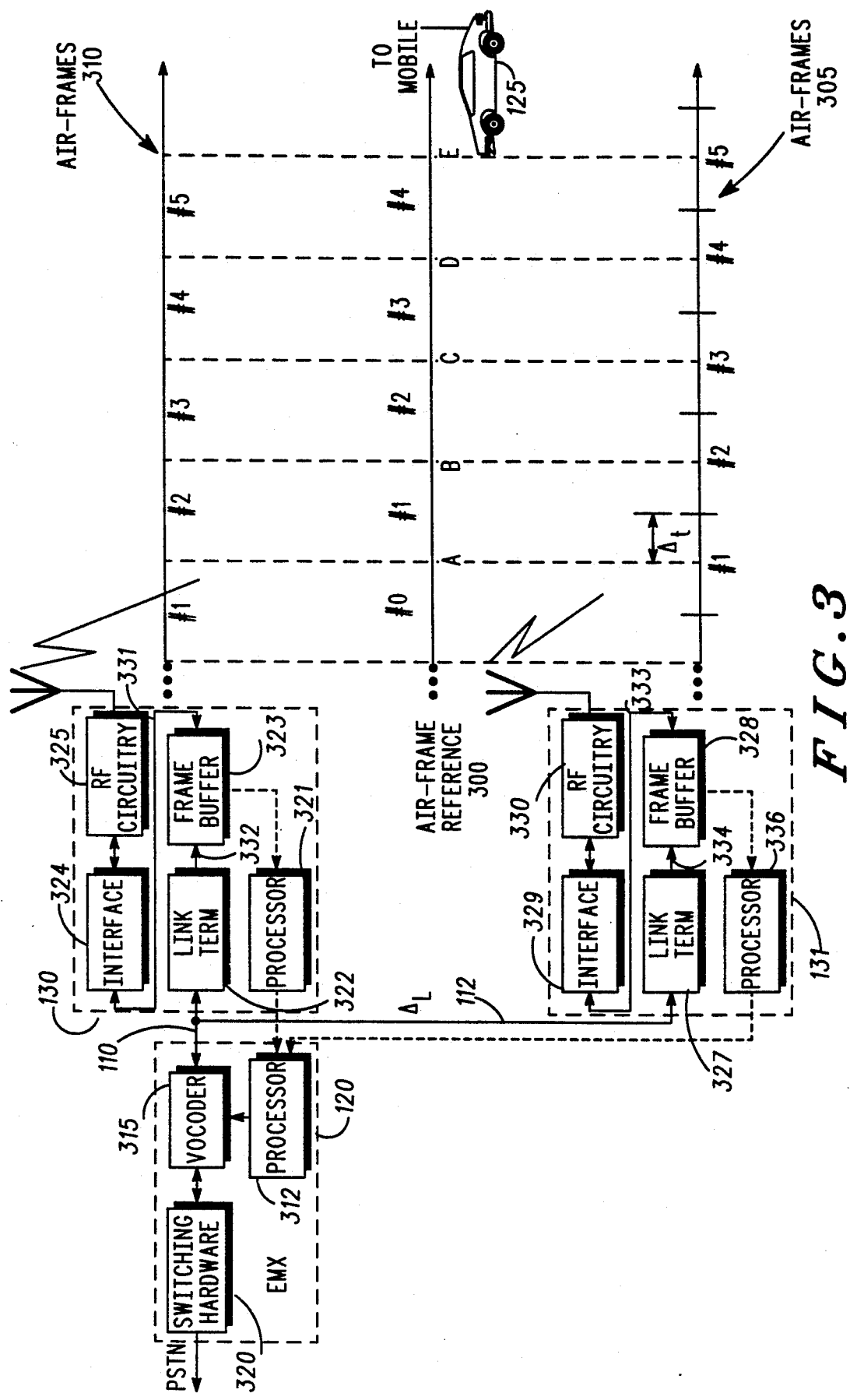
FIG. 3 generally illustrates air-frame delay between two base-stations.

FIG. 3 generally illustrates air-frame delay between two base-stations which may beneficially employ the present invention. In the preferred embodiment, the EMX 120 contains, inter alia, a vocoder 315, switching hardware 320 coupled to the PSTN, and a processor 312. In future cellular radiotelephone systems embodiments, the vocoder 315 may be physically separate from the EMX 120. Continuing, the vocoder 315 is used to compress voice data from the PSTN, via the switching hardware 320, into packets of compressed voice data which can be transmitted over links 110, 112. When transmitted by the vocoder 315, the packets arrive at the cell in a compressed voice format at an arbitrary time with respect to the air-frame reference 300. After processing the packet of compressed voice data (creating an air-frame for transmission), the base-stations 130, 131 will wait until the next ready air-frame time-period before transmitting the air-frames. The air-frame reference 300 is the timing reference used by base-stations 130, 131 for frame transmission. For example, to initiate an air-frame transmission, a strobe would occur at point A of air-frame reference 300, transmission for air-frame #1 begins (assuming processing for air-frame #1 has been completed before strobe A occurs) and will continue until a strobe occurs at point B. At this time, transmission for frame #2 begins and continues until a strobe occurs at point C. This process continues throughout air-frame transmission of voice data.

The delay which occurs, and is the source of the problem to be solved, is caused by the difference in length between link 112 and link 110, depicted in FIG. 3 as $\Delta_L$. Since the packets of compressed voice data are transmitted by the vocoder 315 to the base-stations 130, 131 at the same time, the packets transmitted to base-station 131 will be delayed by a time related to $\Delta_L$. This time delay is depicted in the air-frames 305 to be transmitted by base-station 131 as $\Delta_t$. If $\Delta_t$ in air-frames 305 were zero and air-frames 305 were in sync with air-frames 310, transmission could start at strobe A of the air-frame reference 300 and continue through frame #1 of air-frame reference 300 until the strobe occurring at point B. However, since the air-frames 305 to be transmitted by base-station 131 is delayed by $\Delta_t$ and thus processing into an air-frame has not been completed by time A, if no alignment were made, the earliest air-frame that transmission could occur is #2 of air-frame reference 300. In the preferred embodiment, each air-frame (#0, #1, ...) of air-frame reference 300 and the air-frames 305, 310 to be transmitted is 20 milliseconds in time. Thus, if base-station 131 transmits air-frame #1 of air-frames 305 in reference air-frame #2 of air-frame reference 300, while base-station 130 transmits air-frame #1 of air-frames 310 in reference air-frame #1 of air-frame reference 300, diversity reception in the mobile 125 could not be performed and soft handoff would be impossible.

To compensate for $\Delta_t$, the air-frames 310 to be transmitted by base-station 130 could be aligned by delaying one full air-frame. This, however, has several drawbacks in the preferred embodiment. First, once the air-frame 310 has been delayed by one full air-frame (20 milliseconds), the delay is maintained with the call for the entire period of the call if the cell is eventually used after handoff. Second, the vocoder 315 outputs the compressed voice frames to each base-station 130, 131 at the same time, so independent alignment of one air-frame 305 or 310 in less than 20 msec increments is not practical.

FIG. 4 generally depicts air-frame alignment in accordance with the invention. In the preferred embodiment, both air-frames 305, 310 are aligned in an equal amount to allow for transmission during the time period of the appropriate air-frame of air-frame reference 300. Referring to FIG. 4, there is shown air-frames 400, 405 which have been advanced in time by an amount at least $\Delta_t$, where $\Delta_t$ is on the order of a few hundreds of $\mu$seconds. Since the end of frame #1 in each of the air-frames 400, 405 to be transmitted occur before the strobe occurring at point A, the strobe occurring at point A can be used as the triggering strobe for transmission. Consequently, frame #1 from each of the air-frames 400, 405 to be transmitted will be transmitted during the time period from strobe A to strobe B of air-frame reference 300. By advancing both of the air-frames to be transmitted 400, 405, the frame delay $\Delta_t$ conflict experienced by the communication system is resolved by adding just several hundreds of a $\mu$second delay to the appropriate cell as opposed to adding 20 msec. delay in other techniques.

To compensate for the delay $\Delta_t$, the size of the frame buffer 323, 328 waiting to be transmitted over the air could be monitored or, time stamped pointers could be used. In the case of compensation for a single-cell configuration, a first pointer might be stamped when a base-station 130 or 131 finishes processing the air-frame, and the second pointer stamped by an air timing strobe, for example, A, B, C, etc. in air-frame reference 300. In the preferred embodiment, the procedure of time advancing or delaying the packets of compressed voice data transmitted from the vocoder 315 (and hence the processed air-frames) is performed by using in-band or out-of-band vocoder commands. One method of advancing and delaying by using a vocoder is described in GSM recommendation 8.60 released by ETSI/PT 12, Version No. 3.2.0, on January, 1990. In this technique, pulse code modulated (PCM) samples are either advanced or delayed before the vocoder depending on the appropriate vocoder command.

In a one cell case (assuming a time-stamped pointer monitoring technique is employed), the packets of compressed voice data arrive at an arbitrary time with respect to the air-frame reference 300 slot strobes A, B, C, etc. One time pointer can be stamped when the processor 210 finishes the air-frame processing of the compressed voice data and the second time pointer could be time stamped when the slot strobes A, B, C, etc. occur. If the difference between the pointers is greater than or equal to a transmission trigger value, half the slot duration (10 msec.) for example, the vocoder 315 could be ordered to advance the packets of compressed voice data by an amount given approximately by 10 msec. minus the pointer difference. If the pointer difference is less than 10 msec., the vocoder 315 could be ordered to delay the packets of compressed voice data by an amount given approximately by the pointer difference amount. In soft handoff situations (using the time-stamped pointer technique), one of the cells is already aligned to the air-frame reference 300. If the new cell pointer difference is less than 10 msec., no action will be taken by the communication system since the correct frame is ready to be transmitted over the air before the air-frame reference 300 slot strobes A, B, C, etc. If the pointer difference is greater than 10 msec., the new frame is delayed and the vocoder 315 will be ordered to advance (both frames) by an amount approximately equal to $\Delta_t$ in FIG. 3 and FIG. 4.

What I claim is:

1. A communication system having at least a plurality of transmitters, the communication system comprising:
   a vocoder for coding packets of data;
   first means for transmitting a first packet of data and second means for transmitting a second packet of data; and
   means, coupled to said vocoder, for causing said vocoder to align said first and second packets of data to facilitate synchronized transmission by said first and second means for transmitting of said first and second packets of data.

2. The communication system of claim 1 wherein said first and second packets of data are one of either voice or control data.

3. The communication system of claim 2 wherein said first and second packets of data contain identical voice or control data.

4. The communication system of claim 1 wherein said means for causing said vocoder to align further comprises means for causing said vocoder to align said first and second packets of data in time.

5. The communication system of claim 4 wherein said means for causing said vocoder to align said first and second packets of data in time further comprises means for advancing said first and second packets of data in time to facilitate transmission in at least one time frame of a plurality of time frames.

6. A communication system having at least a plurality of transmitters, the transmitters transmitting packets of data in frames having predetermined time durations, the communication system comprising:
   a vocoder for coding packets of data;
   first means for transmitting a first packet of data and second means for transmitting a second packet of data;
   means, coupled to said first means for transmitting and said second means for transmitting, for detecting if one of either of said first or second transmitted packets of data is delayed beyond the predetermined time duration of a frame; and
   means, coupled to said vocoder and responsive to said means for detecting, for causing said vocoder to align both of said first and second transmitted packets of data in time to facilitate synchronized transmission in said frame.

7. The communication system of claim 6 wherein said means for causing said vocoder to align both of said first and second transmitted packets of data in time further comprises means for advancing both of said first and second transmitted packets of data in time.

8. The communication system of claim 7 wherein said means for advancing both of said first and second transmitted packets of data in time further comprises means for advancing both of said first and second transmitted packets of data in time when said means for detecting detects that one of either said first or second data packets is delayed beyond a predetermined time duration of said frame.

9. A communication system having at least a plurality of transmitters, each of said plurality of transmitters being coupled to a vocoder for coding packets of data for transmission in frames having predetermined time durations, the communication system comprising:
   first means for transmitting a first packet of data during the predetermined time duration of at least one of consecutive first and second frames and second means for transmitting a second packet of data during the predetermined time duration of at least one of said consecutive first and second frames;
   means, coupled to said first and second means for transmitting, for detecting if one of either of said first or second transmitted packet of data overlaps, in time, said first and second frames; and
   means, coupled to said means for detecting, for advancing both of said first and second transmitted packets of data in time to facilitate synchronized transmission during the predetermined time duration of said first frame.

10. The communication system of claim 9 wherein said means for advancing both of said first and second transmitted packets of data in time is done prior to the vocoder.

11. A method of transmission synchronization in a communication system, the communication system having at least a plurality of transmitters, the method comprising the steps of:
   coding packets of data in a vocoder;
   transmitting a first packet of data and transmitting a second packet of data; and
   aligning, via said vocoder, said first and second packets of data to facilitate synchronized transmission.

12. The method of claim 11 wherein said first and second packets of data are one of either voice or control data, wherein said first and second packets of data may contain identical voice or control data, and wherein said step of aligning further comprises the step of aligning said first and second packets of data in time.

13. The method of claim 12 wherein said step of aligning said first and second packets of data in time further comprises the step of advancing said first and second packets of data in time to facilitate transmission in a time frame of a plurality of time frames.

14. A method of data packet transmission synchronization in a communication system, the communication system having at least a plurality of transmitters, the transmitters transmitting packets of data in frames having predetermined time durations, the method comprising the steps of:
   coding packets of data in a vocoder;
   transmitting a packet of data on a first transmitter and transmitting a duplicate of said packet of data on a second transmitter;
   detecting if one of either of said transmitted packets of data is delayed beyond a predetermined time duration of a frame; and
   aligning, via said vocoder, both of said transmitted packets of data in time to facilitate synchronized transmission in said frame in response to said step of detecting.

15. The communication system of claim 14 wherein said step of aligning both of said transmitted packets of data in time further comprises the step of advancing both of said transmitted packets of data in time.

16. The communication system of claim 15 wherein said step of advancing both of said transmitted packets of data in time further comprises the step of advancing both of said transmitted packets of data in time when said step of detecting detects that one of either said transmitted data packets is delayed beyond a predetermined time duration of said frame.

17. A method of data packet transmission synchronization in a communication system, the communication system having at least a plurality of transmitters, the transmitters coupled to a vocoder for coding packets of data for transmission in frames having predetermined time durations, the method comprising the steps of:

transmitting a first packet of data during the predetermined time duration of at least one of consecutive first and second frames and transmitting a second packet of data during the predetermined time duration of at least one of said consecutive first and second frames;

detecting if one of either of said first or second transmitted packet of data overlaps, in time, said first and second frames; and advancing both of said first and second transmitted packets of data in time to facilitate synchronized transmission during the predetermined time duration of said first frame.

18. The method of claim 17 wherein said step of advancing both of said first and second transmitted packets of data in time is done prior to the vocoder.

19. A method for providing data packet timing alignment in a communication system, the method comprising the steps of:

transmitting, via a vocoder, a packet of data to first and second base-stations separated from said vocoder by first and second distances to incur a delay in the reception of said packet of data by said first base-station compared to said second base-station;

compensating for said delay by advancing, in time, a transmission from said vocoder by a time greater than or equal to said delay;

processing said packet of data in said first and second base stations; and transmitting the processed packet of data from said first and second base stations upon receipt of a strobe signal.

* * * * *